United States Patent [19]

Byrne

[11] 4,044,707
[45] Aug. 30, 1977

[54] INTERRUPTIBLE TIME-TEMPERATURE INDICATOR
[75] Inventor: Charles H. Byrne, Pearl River, N.Y.
[73] Assignee: General Foods Corporation, White Plains, N.Y.
[21] Appl. No.: 583,942
[22] Filed: June 5, 1975
[51] Int. Cl.² ............... G01K 11/06; G01D 1/00
[52] U.S. Cl. ............... 116/114.5; 23/230 A; 116/114 Y
[58] Field of Search ............... 116/106, 114.5, 114 Y, 116/114 AM, 114 V; 73/358; 23/230 A, 253 TP; 229/51 S, 51 TS, 51 R

[56] References Cited
U.S. PATENT DOCUMENTS

| 881,011 | 3/1908 | Lambert | 229/51 TS |
|---|---|---|---|
| 2,325,145 | 7/1943 | Martin | 229/51 S |
| 3,006,313 | 10/1961 | Huyck et al. | 116/114 VX |
| 3,036,894 | 5/1962 | Forestiere | 23/230 A |
| 3,242,733 | 3/1966 | Johnson | 116/114.5 X |
| 3,420,205 | 1/1969 | Morison | 116/114.5 |
| 3,479,877 | 11/1969 | Allen et al. | 73/358 |
| 3,521,489 | 7/1970 | Finkelstein et al. | 73/358 |
| 3,677,088 | 7/1972 | Lang | 73/358 |
| 3,834,226 | 9/1974 | Pecorella | 116/106 X |

Primary Examiner—Richard C. Queisser
Assistant Examiner—Daniel M. Yasich
Attorney, Agent, or Firm—Bruno P. Struzzi; Thomas V. Sullivan; Mitchell D. Bittman

[57] ABSTRACT

An indicator including a fluid source and an interruptible wick. The interruptible wick of this invention is severed from the fluid source at any desired point in time after the indicator has been activated thus stopping the recordation of the indicator.

8 Claims, 7 Drawing Figures

INTERRUPTIBLE TIME-TEMPERATURE INDICATOR

BACKGROUND OF THE INVENTION

What many industries need is a time-temperature indicator for learning what is going on in the field. For example, in the frozen food industry, a shipper would like to know if the shipments are being handled properly and if not, where they are being mishandled. To do this the shipper would need reliable time-temperature information available to him.

One severe limitation of prior art time-temperature indicators such as those disclosed in U.S. Pat. No. 3,414,415 by Broad and U.S. Pat. No. 3,479,877 by Allen et al. is that they require on the spot trained observers to note, interpret and conclude what the indicator says. If the observer removes the indicator, it will continue to record change. If the observer forgets to read it promptly after removal, the information will probably be inaccurate. If the observer knows what the indicator should read, he can furnish the answers he thinks the shipper will like.

It is an object of this invention to provide an indicator in which the time-temperature recordation can be stopped at any desired point in time, and which does not require an on the spot trained observer to interpret.

SUMMARY OF THE INVENTION

Briefly stated, this among other objects of the present invention, is accomplished by a time-temperature indicator comprising a fluid source, and an interruptible wick which is in contact with said fluid source upon activation of the time-temperature indicator. The preferred embodiments of said interruptible wick comprise a wick which has a weakened area, or a wick which has a cutting device incorporated, or where the entire wick is removable from contact with said fluid source or where a shield can be placed in between the fluid source and the wick. Preferably said interruptible wick is secured to a backing sheet.

BRIEF DESCRIPTION OF THE DRAWING

Several embodiments of the apparatus of this invention are shown in the accompanying drawings in which like numerals denote like parts throughout the several views and in which.

DETAILED DESCRIPTION OF THE INVENTION

Additional objects, if not specifically pointed out herein, will be readily apparent to one skilled in the art from the following detailed description:

The time-temperature indicator of this invention comprises a fluid source 10 and an interruptible wick 11. The fluid source can contain any one of the indicator substances known to prior art, or it can contain any substance which has a well-defined melting range and which has a set rate of migration along a wick when melted. For example, low molecular weight paraffins or eutectic solutions are useful, although factors such as storeability, desired melting range and migration rates must be considered in choosing the most suitable indicator substance. Preferably dyes are added to the indicator substances so the migration of the indicator substance on the wick will show up clearly. The fluid source is adapted to contain said indicator substance preferably through use of containers or porous pads.

This fluid source is to be in contact with the interruptible wick upon activation of the indicator so as to allow migration of the indicator substance when melted on the wick. This activation can comprise of simply placing the wick in contact with the fluid source, or removing or rupturing a barrier placed in between the fluid source and the wick to prevent contact. The indicator substance can be either a liquid or a solid adapted to melt under conditions of use. The activation can also comprise means by which a liquid indicator substance contained in the fluid source upon freezing will expand and rupture the barrier between the fluid source and the interruptible wick thus allowing contact between the two. In summary, this activation can comprise of any means of placing the fluid source in contact with the interruptible wick so as to allow migration of the indicator substance contained in the fluid source onto the interruptible wick.

Figure 1:
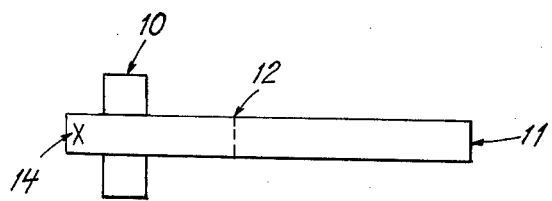
FIG. 1 is a top plan view of an embodiment of this invention wherein a wick with a weakened area (e.g. perforations) is employed.
Figure 2:
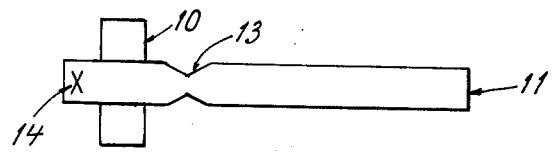
FIG. 2 is a top plan view of an embodiment of this invention wherein a wick with a weakened area (e.g. a notch) is employed.

The interruptible wick of this invention is a wick capable of being removed from contact with the fluid source after activation of the indicator. This invention contemplates several preferred means of separating or severing the wick from the fluid source. The first as exemplified in FIGS. 1 and 2 is where the wick has a weakened area (12 and 13). FIG. 1 shows an embodiment where the weakened area is a line of perforations 12 and FIG. 2 shows an embodiment where the weakened area is a notch 13. The wick being preferably anchored 14 at the end near the fluid source so upon pulling the opposite end the wick will become severed at the weakened area. This severance takes place and the weakened area is positioned accordingly at a point on the wick sufficiently close to the fluid source so that a substantial portion of the wick will be severed.

Figure 3:
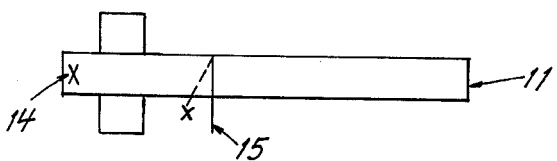
FIG. 3 is a top plan view of an embodiment wherein a wick with a cutting device (e.g. a string) is employed.

The next embodiment of the interruptible wick as exemplified in FIG. 3 is where a cutting device 15 such as a string, tape, glass fiber or wire is incorporated into or on the interruptible wick 11. This cutting device when pulled severs the wick from the fluid source at the point on the wick where the cutting device is incorporated. The interruptible wick 11 is preferably anchored 14 at the end near the fluid source 10 so as to facilitate the use of the cutting device 15. The cutting device is incorporated at a point on the wick so that upon severance a substantial portion of the wick will be severed.

Figure 4:
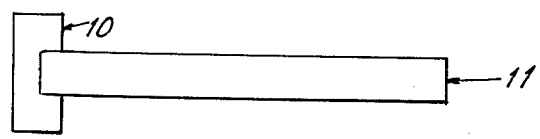
FIG. 4 is a top plan view of an embodiment wherein a wick which can be removed is employed.

The third preferred embodiment as exemplified in FIG. 4 is where the entire interruptible wick 11 can be removed thus severing the fluid source 10 from the wick 11. In this embodiment the wick is not anchored but is snugly fitted.

Figure 5:
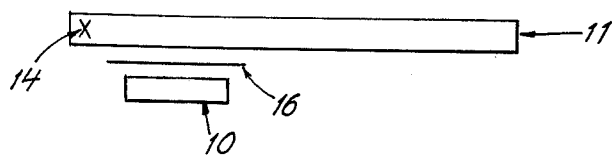
FIG. 5 is a side view of an embodiment wherein a shield is inserted.

Another preferred embodiment as exemplified in FIG. 5 is where a shield 16 can be inserted between the wick 11 and the fluid source 10 thus preventing contact between the fluid source and the wick, said shield to be preferably impervious to the indicator substance contained in the fluid source.

Figure 6:
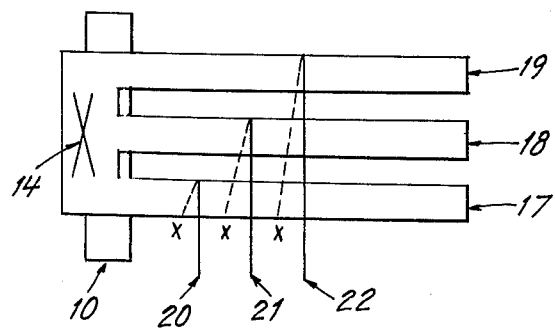
FIG. 6 is a top plan view of a multiple application of the embodiment pictured in FIG. 3.

Another preferred embodiment of this invention is exemplified in FIG. 6. FIG. 6 pictures a multiple application with one fluid source 10 and three wicks 17, 18 and 19 leading to this fluid source and anchored 14 near it, each wick having its corresponding cutting device 20, 21 or 22. Therefore after activation, at different stages during the monitoring a different wick can be severed thus providing accurate time-temperature information at three stages of the monitoring. For example, upon shipment the indicator can be activated and when warehouse A is reached the first wick 17 can be severed, when warehouse B is reached the second wick 18 can be severed and upon reaching the retail outlet the last wick 19 can be severed. After each interruptible wick is severed or after the last one is severed, the wick or the whole indicator can be sent to a central monitoring office which will determine how the product was handled at different stages of the shipment. These wicks also provide evidence that the products were being mishandled or handled properly.

Alternatively, the time-temperature indicator of this invention can comprise of a series of fluid sources containing different indicator substances with different melting ranges and a series of corresponding interruptible wicks, thus obtaining accurate time-temperature information over several temperature ranges.

Figure 7:
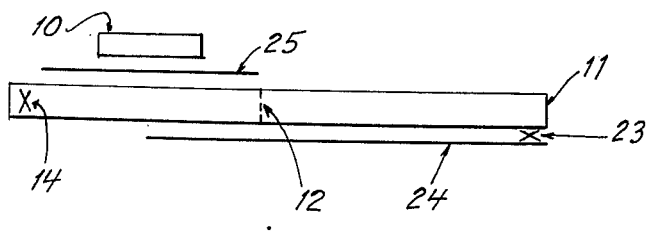
FIG. 7 is a side view of a preferred application of the embodiment pictured in FIG. 1 employing a backing sheet.

Preferably the interruptible wick 11 of this invention as shown in FIG. 7 is to be secured 23 (anchored) to a backing sheet 24. This backing sheet being employed in order to facilitate the handling of the interruptible wick after it has been separated or severed from the fluid source. The indicator of FIG. 7 is activated by removing the barrier 25. Upon exposure of the indicator to use conditions, the interruptible wick 11 is severed at the line of perforation 12 from the fluid source 10. The severed portion of the wick on the backing sheet is then removed and handled accordingly.

The backing sheet is preferably in the form of a mailing card so that upon severing the wick from the fluid source the backing sheet-mailing card with the severed wick thereon can be dropped in the mailbox and sent to a central monitoring office where the information on the wick can be interpreted. The mailing card preferably encloses the wick for mailing so that the wick will not be damaged or the indicator substance on the wick will not stain any other mail. In this way a novel and elegantly simple indicator is provided which can provide accurate and reliable time-temperature information which a shipper can verify for himself by referring to the wicks which have been sent to him.

EXAMPLE

Three interruptible time-temperature indicators (A, B and C) were constructed in accordance with the design pictured in FIG. 3. Each indicator had a fluid source comprising an indicator substance of 0.5 ml of 1% aqueous Methylene Blue with a melting temperature of approximately 0° C, contained in a pad of eight thicknesses of Watman No. 42 filter paper each 20 mm. × 20 mm. and a wick comprising one thickness of Watman No. 42 filter paper 7 mm. × 170 mm. Unit A was activated and held at +22° C. Unit B was activated and held at +22° C for 30 minutes at which point the wick was separated from the fluid source. Unit C was activated and stored at −17° C for 24 hours, transferred to +22° C for 30 minutes at which point the wick was separated from the fluid source.

The indicator substance of Unit A migrated at a rate of approximately 0.45 mm./minute.

The indicator substance of Unit B migrated at approximately 0.45 mm./minute until the wick was separated from the fluid source and thereafter the migration was negligible.

The indicator substance in Unit C did not migrate at all during the 24 hours, it was at −17° C. After transfer to +22° C the dye migrated at approximately 0.45 mm./minute. When the wick was separated from its fluid source after 30 minutes exposure at +22° C the dye ceased to migrate.

What is claimed is:

1. A time-temperature indicator comprising: a fluid source and an interruptible wick in contact with said fluid source upon activation of said time-temperature indicator, said wick being interruptible through severance at a weakened area after activation of said indicator, and said fluid source containing an indicating substance which has a defined melting range and a set rate of migration along said wick when melted and after activation of said indicator.

2. The indicator of claim 1 wherein said weakened area is a notch.

3. The indicator of claim 1 wherein said weakened area is a line of perforations.

4. The indicator of claim 1 wherein said interruptible wick is secured to a backing sheet.

5. The indicator of claim 4 wherein said backing sheet is in the form of a mailing card.

6. A time-temperature indicator comprising: a fluid source and an interruptible wick in contact with said fluid source upon activation of said time-temperature indicator, said wick being interruptible through severance by a cutting device incorporated on it after activation of said indicator, and said fluid source containing an indicating substance which has a defined melting range and a set rate of migration along said wick when melted and after activation of said indicator.

7. The indicator of claim 6 wherein said interruptible wick is secured to a backing sheet.

8. The indicator of claim 7 wherein said backing sheet is in the form of a mailing card.

* * * * *